(12) United States Patent  (10) Patent No.: US 7,765,049 B2
Potter et al.  (45) Date of Patent: Jul. 27, 2010

(54) BRAKING SYSTEM (75) Inventors: Laurence John Potter, Moseley (GB);
Robert David Prescott, Solihull (GB)

(73) Assignee: Haldex Brake Products Ltd. (GB)

( * ) Notice: Subject to any disclaimer, the term of this patent is extended or adjusted under 35 U.S.C. 154(b) by 0 days.

(21) Appl. No.: 12/042,836

(22) Filed: Mar. 5, 2008

(65) Prior Publication Data

US 2008/0215222 A1 Sep. 4, 2008

Related U.S. Application Data

(63) Continuation of application No. PCT/GB2006/003281, filed on Sep. 6, 2006.

(30) Foreign Application Priority Data

Sep. 6, 2005 (GB) .................................. 0518133.4

(51) Int. Cl.
*G06F 19/00* (2006.01)
*B60T 7/00* (2006.01)
(52) U.S. Cl. .................. 701/70; 192/219.4; 192/219.6; 340/457.3; 73/121; 188/31
(58) Field of Classification Search .................. 701/70; 340/457.3; 192/219.4, 219.6
See application file for complete search history.

(56) References Cited

U.S. PATENT DOCUMENTS

| | | |
|---|---|---|
| 3,985,210 A | 10/1976 | Hodge et al. |
| 4,166,513 A | 9/1979 | Johnson |
| 4,281,736 A * | 8/1981 | Lizzio .......................... 180/271 |
| 4,502,718 A * | 3/1985 | Sasaki et al. ............. 292/336.3 |
| 5,119,912 A * | 6/1992 | Martin ..................... 192/219.7 |

(Continued)

FOREIGN PATENT DOCUMENTS

EP 1179462 A1 2/2002

(Continued)

OTHER PUBLICATIONS

International Search Report, Dec. 18, 2006, 2 pages.

(Continued)

*Primary Examiner*—Thomas G Black
*Assistant Examiner*—Lin B Olsen
(74) *Attorney, Agent, or Firm*—St. Onge Steward Johnston & Reens LLC (57) ABSTRACT

A braking system including a brake, a brake actuator which is operable to apply a force to the brake to effect braking, an automatic braking controller, and a manually operable brake actuator control device, the brake actuator control device including a manually operable control part which is movable between a release position and an apply position and which is adapted such that movement of the control part by a user from the release position to the apply position causes the brake actuator to apply the brake and movement of the control part by a user from the apply position to the release position causes the brake actuator to release the brake, the brake actuator control device being characterized in that it further includes a control actuator which engages with the control part and which is adapted to effect movement of the control part from the release position to the apply position on receipt of an appropriate signal from the automatic braking controller.

16 Claims, 10 Drawing Sheets

U.S. PATENT DOCUMENTS

| | | | | |
|---|---|---|---|---|
| 5,675,190 | A * | 10/1997 | Morita | 307/10.1 |
| 5,704,693 | A * | 1/1998 | Mackiewicz | 303/3 |
| 5,897,173 | A * | 4/1999 | Hardin | 303/3 |
| 7,322,457 | B2 * | 1/2008 | Giefer et al. | 192/219.4 |
| 2001/0030093 | A1 * | 10/2001 | Lundholm et al. | 188/156 |
| 2001/0032760 | A1 | 10/2001 | Astrom et al. | |
| 2002/0023818 | A1 * | 2/2002 | Yanaka et al. | 192/219.4 |
| 2005/0077781 | A1 * | 4/2005 | Brancolini et al. | 303/15 |
| 2006/0232125 | A1 * | 10/2006 | Thomas | 303/7 |
| 2007/0080579 | A1 * | 4/2007 | Steinbring | 303/6.1 |
| 2008/0133073 | A1 * | 6/2008 | Griffith et al. | 701/9 |

FOREIGN PATENT DOCUMENTS

| | | | |
|---|---|---|---|
| EP | 1179463 | A1 | 2/2002 |
| FR | 2819767 | A1 | 7/2002 |
| GB | 522063 | A * | 1/1939 |
| JP | 60203559 | A | 10/1985 |
| JP | 60252048 | A | 12/1985 |
| JP | 60252048 | A * | 12/1985 |
| JP | 62247958 | A | 10/1987 |
| JP | 9175353 | A | 7/1997 |
| WO | 0020268 | A1 | 4/2000 |

OTHER PUBLICATIONS

GB Search Report, Dec. 20, 2006, 1 page.
United Kingdom Search Report; Application No. GB0158133.4; Nov. 16, 2005; 1 page.

* cited by examiner

BRAKING SYSTEM

The present application is a continuation of pending International patent application PCT/GB2006/003281 filed on Sep. 6, 2006 which designates the United States and claims priority from the United Kingdom patent application 0518133.4 filed on Sep. 6, 2005 the content of which is incorporated herein by reference.

FIELD OF THE INVENTION

The present invention relates to a braking system, and a brake actuator control device, particularly, but not exclusively, for use in the application of the parking brake in a truck or lorry.

BACKGROUND OF THE INVENTION

In vehicles such as trucks or lorries, it is necessary to provide two means of braking—a service brake which is adapted to be used by the driver to control the speed of the vehicle whilst the vehicle is moving, and a parking brake which is adapted to be used by the driver to apply the brakes in a hill start situation or when the vehicle is parked. The parking brake actuator is operated to apply or release the brake by means of a manually operable control device, typically a control lever. In a conventional pneumatic braking system, in normal use, movement of the control lever causes a pneumatic signal to be sent to the parking brake actuator, and thus the position of the control lever provides a visual indication of the state of the parking brake, i.e. whether the parking brake is applied or released. Thus, it is relatively easy for a user to check that the parking brake is in the desired state, e.g. if the vehicle is to be towed that the parking brake is released.

It is becoming more common to use electrically controlled braking systems in which operation of the brake actuator is controlled by means of an electrical signal from a central controller. A manually operable control device is provided in such systems, but, typically, operation of the control lever causes an electrical demand signal to be sent to the controller, which, in turn, sends an appropriate electrical signal to a control valve to release the pneumatic pressure required to restrain the brake actuator from moving under the biasing force of a spring, thus causing the brake actuator to move under the spring force to apply the brake. In such systems it is proposed to provide the facility of automatic application of the parking brake, for example if the driver removes the keys from the ignition without applying the parking brake. Automatic operation of the parking brake would be initiated by the controller, without any movement of the control lever. Thus, it should be appreciated that, in such a system, the position of the control lever does not provide an accurate indication of the state of the parking brake.

SUMMARY OF THE INVENTION

It is known to address this problem by including a warning light to provide an indication that the parking brake has been applied automatically, but this solution is not ideal as, generally speaking, the vehicle ignition must be on for the lamp to work, the driver must be seated in the vehicle cab for the warning lamp to be visible, and the driver must appreciate the significance of this one warning lamp amongst all the other lamps, dials and other indicating devices within the cab.

According to a first aspect of the invention we provide a braking system including a brake, a brake actuator which is operable to apply a force to the brake to effect braking, an automatic braking controller, and a brake actuator control device which is manually operable, the brake actuator control device including a control part, which is manually operable which is movable between a release position and an apply position and which is adapted such that movement of the control part from the release position to the apply position causes the brake actuator to apply the brake and movement of the control part from the apply position to the release position causes the brake actuator to release the brake, the brake actuator control device being characterized in that it further includes a control actuator which, when in a set position, is adapted to engage with the control part and effect movement of the control part from the release position to the apply position on receipt of an appropriate signal from the automatic braking controller.

Preferably the brake actuator is operable to apply a force to the brake to effect braking, an automatic braking controller, and a manually operable brake actuator control device, the brake actuator control device including a manually operable control part which is movable between a release position and an apply position and which is adapted such that movement of the control part user from the release position to the apply position causes the brake actuator to apply the brake and movement of the control part user from the apply position to the release position causes the brake actuator to release the brake, the brake actuator control device being characterised in that it further includes a control actuator which, when in a set configuration, is adapted to engage with the control part and effect movement of the control part from the release position to the apply position on receipt of an appropriate signal from the automatic braking controller.

Preferably, one or both of the control part and the control actuator adopts a first configuration on movement of the control part manually from the release position to the apply position, and adopts a second configuration on movement of the control part from the release position to the apply position under the action of the control actuator.

The control actuator is preferably configured such that, after movement of the control part to the apply position under the action of the control actuator, manual return of the control part to the release position automatically returns the control actuator to the set configuration.

Preferably manual movement of the control part between the release position and the apply position is permitted whilst the control actuator is in the set configuration.

Thus, by virtue of the invention, the control device position gives an accurate indication of the state of the parking brake irrespective of whether the brake was applied manually or by an automatic override system.

Preferably the control actuator is electrically operated, movement of the control part from the release position to the apply position occurring on receipt of an appropriate electrical signal from the automatic braking controller. In this case, the control actuator may be operated by means of an electrical solenoid, the movement of the control actuator required to move the control part from the release position to the apply position being achieved by passing an electric current through the solenoid.

Preferably the control actuator includes a resilient biasing element which biases the control actuator into a position in which the control part is moved to the apply position.

In this case, the control actuator may include a keeper element which is biased by means of the resilient biasing element into an active position in which the keeper element bears on the control part and moves the control part to the apply position, and the control actuator further including a latch member which is capable of engagement with the keeper element to retain the keeper element in a passive position whereby the control part is permitted to move to the release position, the latch member moving on receipt of an appropriate signal from the automatic brake controller to release the keeper element so that the keeper element can move under the biasing force of the resilient biasing element to bring the control part to the apply position.

Alternatively, the control actuator may include a latch member which engages with a keeper element which is fixed on or integral with the control part, the latch member being movable so that when the latch member is engaged with the keeper element and the control part is moved manually by a user, the latch member moves with the control part, the control actuator further including resilient biasing element which extends between the latch member and the control part so that when the latch member is released from engagement with the keeper element, the resilient biasing element exerts a force on the control part and the latch member to move the control part to the apply position.

By virtue of these arrangements, once the latch has been moved to release the keeper element, and hence move the control part to the apply position, in order to return the control part to the release position, a user must push the control part against the biasing force of the resilient biasing element, until the latch member engages with the keeper element once more. Thus, a user, when discovering the control part to be in the apply position, can establish whether the control part was moved manually to the apply position, or whether the control part was moved to the apply position by the control actuator, either by visual inspection or by noting the additional force required to return the control part to the release position.

The brake actuator control device may include a further resilient biasing element which biases the control part to the release position. In this case, where control actuator includes a resilient biasing element, preferably the resilient biasing element of the control actuator exerts a larger biasing force than the further resilient biasing element exerts on the control part.

The brake actuator control device may further include a control signal generating means which generates a demand signal on movement of the control part between the release position and apply position. In this case, the brake actuator control device may be connected to the brake actuator such that the demand signal is transmitted to the brake actuator to cause the brake actuator to apply or release the brake as appropriate. Alternatively, the brake actuator control device may be connected to the automatic brake controller such that the demand signal is transmitted to the automatic brake controller which in turn transmits a signal to the brake actuator to cause the brake actuator to apply or release the brake as required. The demand signal is preferably a electrical signal, but may be a pneumatic or hydraulic signal.

Preferably the control part includes a lever which is pivotable between the apply position and the release position.

According to a second aspect of the invention, we provide a control device including a lever which is mounted on a base and movable from a first position to a second position relative to the base, and an actuator, the actuator including resilient biasing means and an electrically operable catch member which is movable from an engaged position to a release position, the actuator being adapted to permit free movement of the lever when the catch member is in the engaged position, and to act on the lever to move the level from the first position to the second position, under a biasing force provided by the resilient biasing means.

BRIEF DESCRIPTION OF THE DRAWINGS

Embodiments of the invention will now be described, by way of example only, with reference to the accompanying drawings of which, FIG. 2 is an illustration of a first embodiment of manually operable brake actuator control device suitable for use in the braking system illustrated in FIG. 1, a) with the control part in a release position, b) with the control part in the apply position, having been brought to the apply position manually by a user, and c) with the control part in the apply position, having been brought to the apply position by the control actuator, FIG. 3 is a schematic illustration of the manually operable brake actuator control device suitable for use in the braking system illustrated in FIG. 1, a) with the control part in a release position, b) with the control part in the apply position, having been brought to the apply position manually by a user, and c) with the control part in the apply position, having been brought to the apply position by the control actuator, FIG. 4 is an illustration of a second embodiment of manually operable brake actuator control device suitable for use in the braking system illustrated in FIG. 1, a) with the control part in a release position, b) with the control part in the apply position, having been brought to the apply position manually by a user, and c) with the control part in the apply position, having been brought to the apply position by the control actuator.

FIG. 6 is an illustration of the second embodiment of manually operable brake actuator control device suitable for use in the braking system illustrated in FIG. 1, a) with the control part in a release position, b) with the control part in the apply position, having been brought to the apply position manually by a user, and c) with the control part in the apply position, having been brought to the apply position by the control actuator.

DETAILED DESCRIPTION OF THE INVENTION

Figure 1:
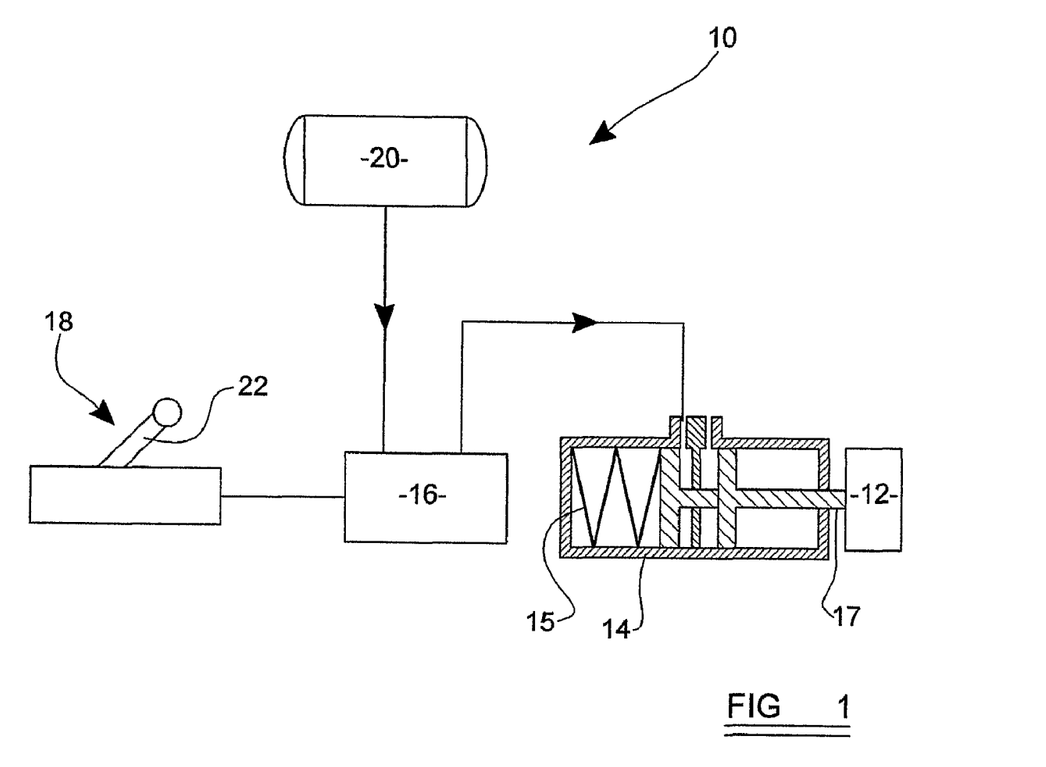
FIG. 1 shows a schematic illustration of a braking system according to the first aspect of the invention.

Referring now to FIG. 1, there is shown a braking system 10 including a brake 12, a brake actuator 14 which is operable to apply a force to the brake 12 to effect braking, an automatic braking controller 16, and a manually operable brake actuator control device 18. In this example, the braking system is for a vehicle such as a truck or lorry, and the brake actuator 14 in question is the parking brake.

In this example the braking system 10 is an electrical braking system, and when a user operates the brake actuator control device 18 in order to effect braking an electrical signal is transmitted to the automatic braking controller 16, which in this example includes an electronic processor and which in turn transmits a demand signal to the brake actuator 14. The brake actuator 14 is of conventional design, contains one or more electrically operated valves, and is connected to a source of pressurised fluid 20, typically compressed air. In this example, the brake is a spring brake, i.e. a braking force is applied by movement of the actuator 14 under the biasing force of a spring 15. Compressed air is applied to the actuator 14 to move the actuator 14 against the biasing force of the spring 15 to release the braking force. On receipt of a demand signal, one or more of the electrically operated valves moves to release compressed air from the actuator 14 such that the spring 15 moves an actuator part 17 which engages with and exerts a force on the brake 12 to effect braking.

It should be appreciated, however, that although the present invention is particularly useful in relation to an electrical braking system, it may equally be applied to a system in which movement of the brake actuator control device 18 generates a hydraulic or pneumatic signal or a mechanical force which is transmitted directly to the brake actuator 14.

The brake actuator control device 18 includes a manually operable control part 22 which is movable between a release position and an apply position and which is adapted such that movement of the control part 22 by a user from the release position to the apply position causes the brake actuator 14 to apply the brake 12 and movement of the control part by a user from the apply position to the release position causes the brake actuator 14 to release the brake 12. In this example, the control part 22 is a lever which is pivotal between the apply position and the release position. It will be appreciated, however, that another appropriate manually operable device, such as a switch or push button, may be used instead of a pivotable lever.

In this example, the lever 22 may be moved from the apply position to a "test" position which is adapted to test the braking system when used in a truck with a trailer. Generally, in a truck with a trailer, application of the parking brake will apply the trailer service brake in addition to the truck parking brake. When the lever 22 is in the test position, the truck parking brake is applied whilst the trailer service brake is released. This enables a user to verify that the truck parking brake alone is sufficient to hold the truck and trailer. Such a test system is conventional in such braking systems.

The lever 22 comprises a stem 22a, one end of which is provided with handle 22b, and the other end of which is mounted on a pivot. On the pivot is mounted a potentiometer 24 of conventional construction, which provides an electrical signal the magnitude of which depends on the angular orientation of the lever 22. The controller 16 is programmed such that when it receives the electrical signal generated by the potentiometer 24 whilst the lever 22 is in the release position, the controller 16 transmits an appropriate signal to the brake actuator 14 to cause the braking force to be removed. Similarly, the controller 16 is programmed such that when it receives the electrical signal generated by the potentiometer 24 whilst the lever 22 is in the apply position, the controller 16 transmits an appropriate signal to the brake actuator 14 to cause a braking force to be applied.

It should be appreciated that the system 10 could be configured to operate in binary states—either the braking force is on or off. In this example, however, the braking force can be varied according to the position of the lever 22. In other words, the lever 22 can be moved to a maximum apply position, in which the signal generated by the potentiometer 24 causes the brake actuator 14 to apply the maximum possible force to the brake 12, and but if the lever 22 is moved to a position between the release position and the maximum apply position, the controller 16 is programmed such that signal generated by the potentiometer 24 causes the controller 16 to operate the brake actuator 14 to apply an intermediate force to the brake 12.

The brake actuator control device 18 further includes a control actuator 26 which engages with the control part 22 and which is adapted to effect movement of the control part 22 from the release position to the maximum apply position on receipt of an appropriate signal from the automatic braking controller 16.

In this example, the brake actuator control device 18 is mounted in a cab of a vehicle in which is provided an ignition device for activation of a vehicle engine, and the controller 16 is adapted to receive an input which indicates whether the ignition device is active, e.g. whether the engine is on or keys are in the ignition. In this case, the controller 16 is programmed to send the signal to the control actuator 26 to move the lever 22 to the maximum apply position, and to transmit an appropriate demand signal to the brake actuator 14 to ensure that maximum braking force is applied to the brake 12, if the signal from the potentiometer 24 indicates that the lever 22 is in the release position and the ignition device is not active, e.g. if the engine has been switched off or the keys removed from the ignition. This ensures that the vehicle is left in a safe condition, i.e. with the parking brake applied, even if the user forgets to use the lever 22 to apply the parking brake before switching off the engine or removing the keys from the ignition, whilst the lever 22 position gives an accurate indication of the state of the parking brake irrespective of whether the brake was applied manually or by the automatic override system.

Where the control device 18 is mounted in a cab of a vehicle such as a lorry or truck, the cab including at least one door, the controller 16 may be adapted to receive an input which indicates that the cab door or at least one of the cab doors is open. In this case, the controller 16 may be programmed to send the signal to the control actuator 26 to move the lever 22 to the maximum apply position, and to transmit an appropriate demand signal to the brake actuator 14 to ensure that maximum braking force is applied to the brake 12, if the signal from the potentiometer 24 indicates that the lever 22 is in the release position and the cab door or at least one of the cab doors is open.

It should be appreciated that, whilst in the present example, the same controller 16 sends the demand signal to the brake actuator 14 and the signal to the control actuator 26, separate controllers may be used for these functions. Moreover, although in the embodiment described above, the controller 16 is programmed to send a demand signal to the brake actuator 14 once it has determined that there is a need automatically to apply the parking brake, the system 10 could be configured such that movement of the lever 22 to the apply position causes the demand signal to be sent to the brake actuator 14 in the same way as if the lever 22 had been moved manually.

Whilst, in this example, the controller 16 is programmed to operate the control actuator 26 as described above if the lever 22 is in the release position, the controller 16 may be programmed to operate the control actuator 26 if the lever 22 is not in the maximum apply position.

Two different embodiments of control actuator 26, 26' are illustrated in FIGS. 2-5. In both versions, the control actuator 26, 26' is electrically operated by means of an electrical solenoid operated actuator 28, 28', movement of the lever 22 to the maximum apply position being achieved by passing an electric current through the solenoid 28, 28', and includes a resilient biasing element 30, 30' which biases the control actuator 26, 26' into a position in which the lever 22 is moved to the maximum apply position.

Figure 2A:
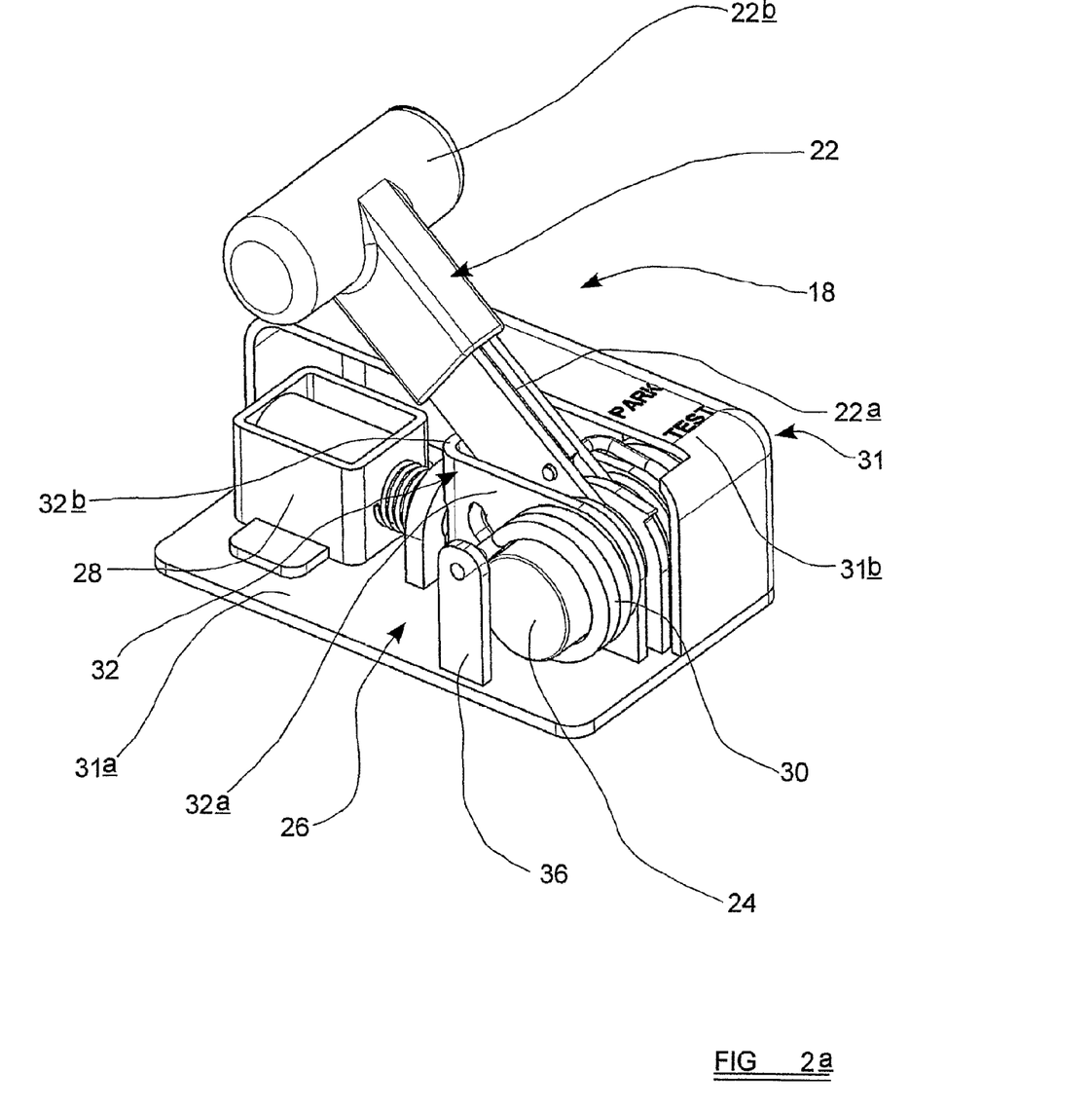
Figure 2B:
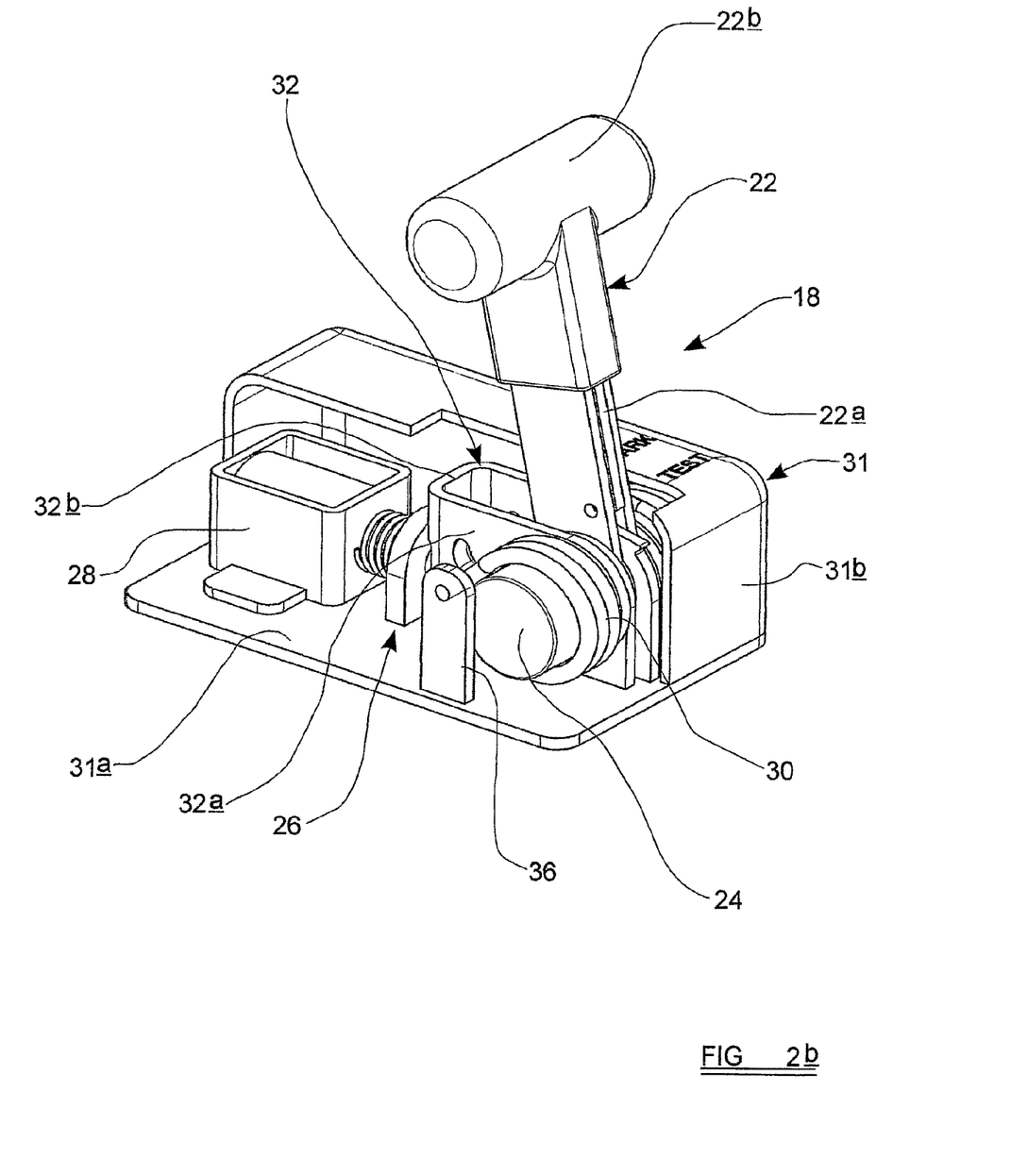
Figure 2C:
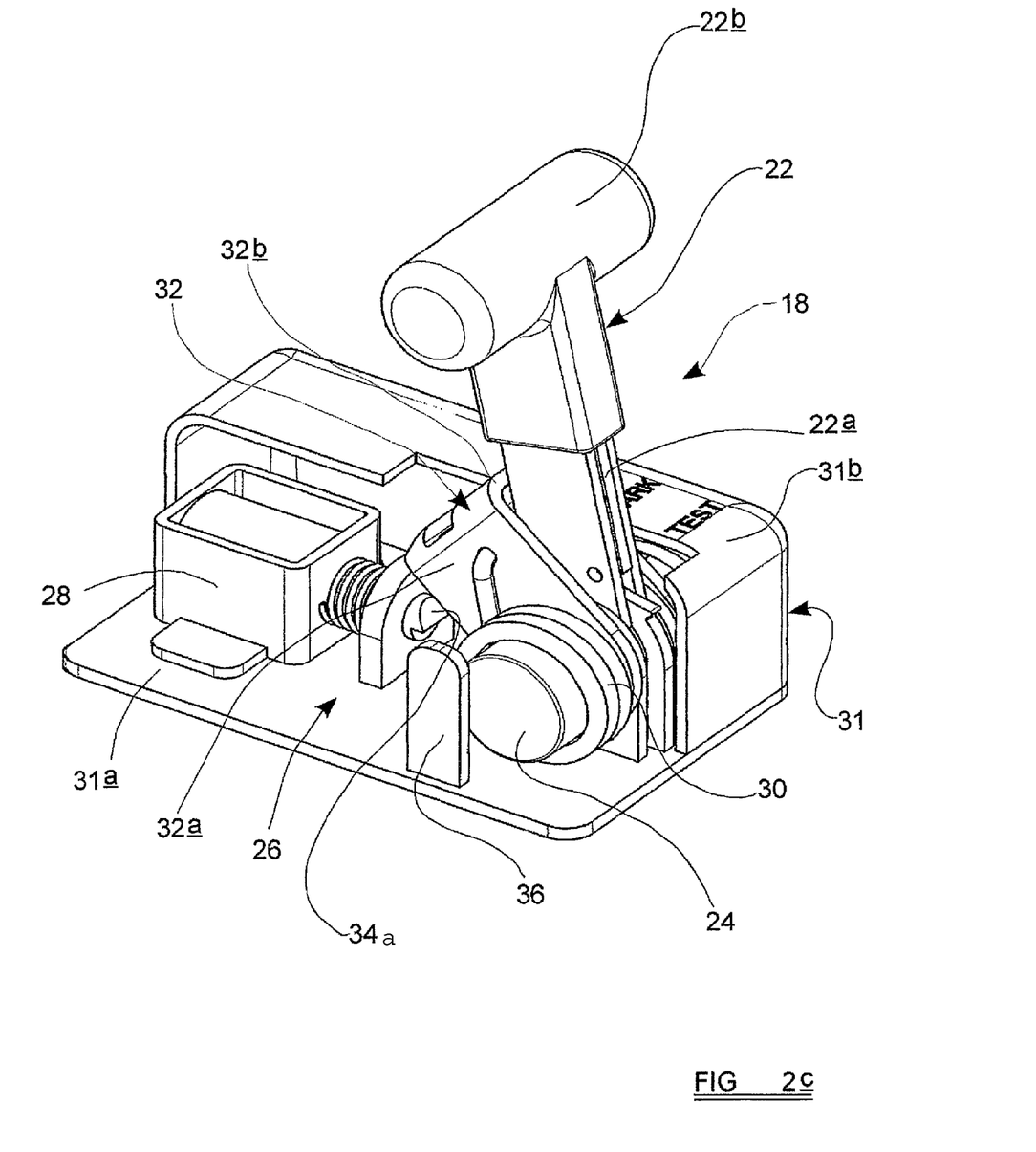
Figure 3A:
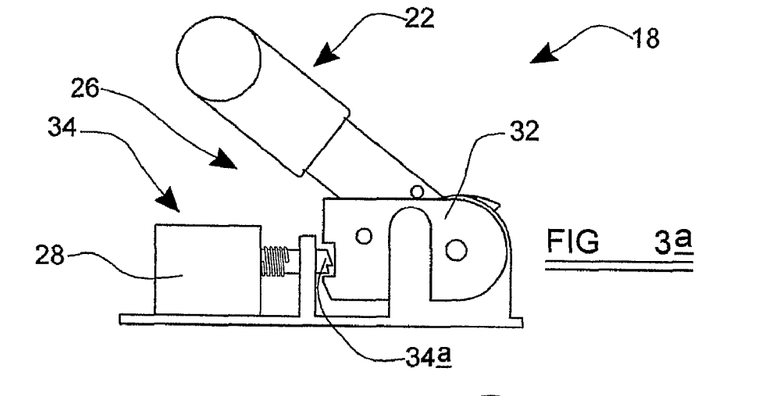
Figure 3B:
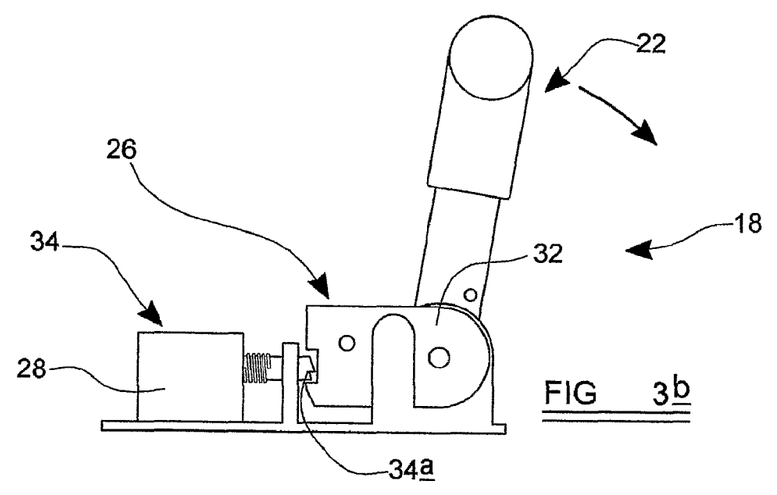
Figure 3C:
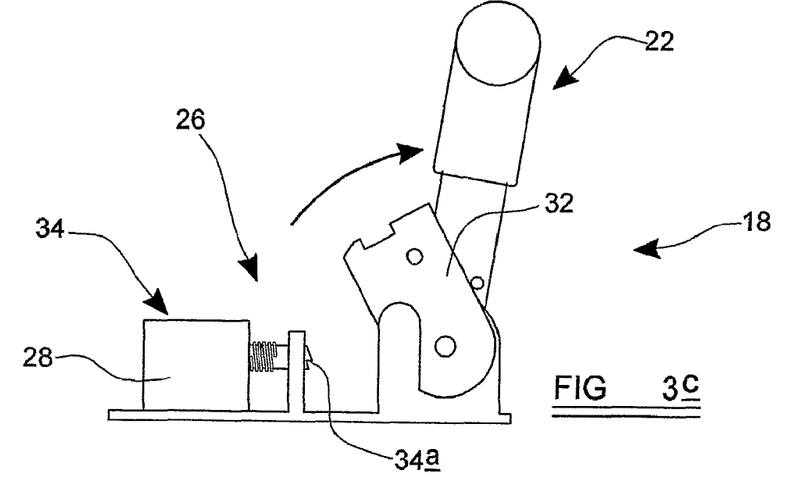

In the first embodiment of control actuator 26, illustrated in FIGS. 2 and 3, the control actuator 26 includes a keeper element 32 which is biased by means of the resilient biasing element 30 into an active position in which the keeper element 32 bears on the lever 22 and moves the lever 22 to the maximum apply position. The control actuator 26 also includes a latch member 34 which may engage with the keeper element 32 to retain the keeper element 32 in a passive position whereby the lever 22 is permitted to move to the release position, the latch member 34 operating on receipt of the signal from the controller 16 to release the keeper element 32 so that the keeper element 32 can move under the biasing force of the resilient biasing element 30 to bring the lever 22 to the maximum apply position.

The control actuator 26 is mounted in a housing 31 comprising a base 31a and a top cover 31b, the top cover 31b including a slot through which the lever 22 extends. The pivot on which the lever 22 is mounted is fixed relative to the base 31a of the housing 31.

The keeper element 32 comprises a generally U-shaped part with two side arms 32a joined by a cross web 32b, the side arms 32a being pivotally mounted on the pivot on which the lever 22 is mounted, one side arm 32a being located on either side of the lever 22. The resilient biasing means 30 comprises a helical compression spring which extends from one side arm 32a of the keeper element 32, around the potentiometer in a plurality of turns and to a spring support 36 which is mounted on the base 31a of the housing, and therefore fixed relative to the pivot.

The latch member 34 comprises a catch portion 34a which is adapted to engage with an aperture provided in the cross web 32b of the keeper element 32 substantially to prevent the keeper element 32 from rotating about the pivot. When the keeper element 32 is engaged with the latch member 34 in this way, the angle between lever 22 and the keeper element 32 is less when the lever 22 is in the release position than when the lever 22 is in the maximum apply position.

The catch portion 34a is mounted on an electrical solenoid operated actuator 28 of conventional construction, which is mounted on and fixed relative to the base 31a of the housing 31. The solenoid operated actuator 28 is configured such that the passage of an electric current through the solenoid causes the catch portion 34a to retract out of engagement with the keeper element 32.

The spring 30 is arranged such that, it is necessary to rotate the keeper element 32 against the biasing force of the spring, thus "charging" the spring, in order to bring the keeper element 32 into engagement with the catch portion 34a. Thus, when the catch portion 34a is moved by the solenoid operated actuator 28 out of engagement with the keeper element 32, the keeper element 32 pivots towards the lever 22 under the effect of the biasing force of the spring 30, and engages with the lever 22. The biasing force provided by the spring 30 is sufficiently large that, if the lever 22 is not in the maximum apply position, the keeper element 32 pushes the lever 22 to the maximum apply position, but is not sufficient to push the lever 22 further into the test position.

Thus, if the lever 22 has been moved to the maximum apply position by the keeper element 32, the keeper element 32 is engaged with the lever 22 but not with the latch member 34, but if the lever 22 was moved manually by a user, the keeper element 32 will not be engaged with the lever 22 but with the catch portion 34a of the latch member 34. Thus, a user, on returning to the vehicle and discovering the lever 22 to be in the maximum apply position, can readily establish whether the lever 22 was moved manually to the maximum apply position, or whether the lever 22 was moved to the maximum apply position by the control actuator 26, by a visual inspection to establish the position of the keeper element 32.

Once the catch portion 34a has been moved to release the keeper element 32, and hence move the lever 22 to the maximum apply position, in order to return the lever 22 to the release position, a user must push the lever 22 against the keeper element 32, and hence also against the biasing force of the spring 30, until the catch portion 34a engages with the keeper element 32 once more. Thus, a user, on returning to the vehicle and discovering the lever 22 to be in the maximum apply position, can also establish whether the lever 22 was moved manually to the maximum apply position, or whether the lever 22 was moved to the maximum apply position by the control actuator 26, by noting the additional force required to "charge" the spring 30 and return the lever 22 to the release position.

Figure 4A:
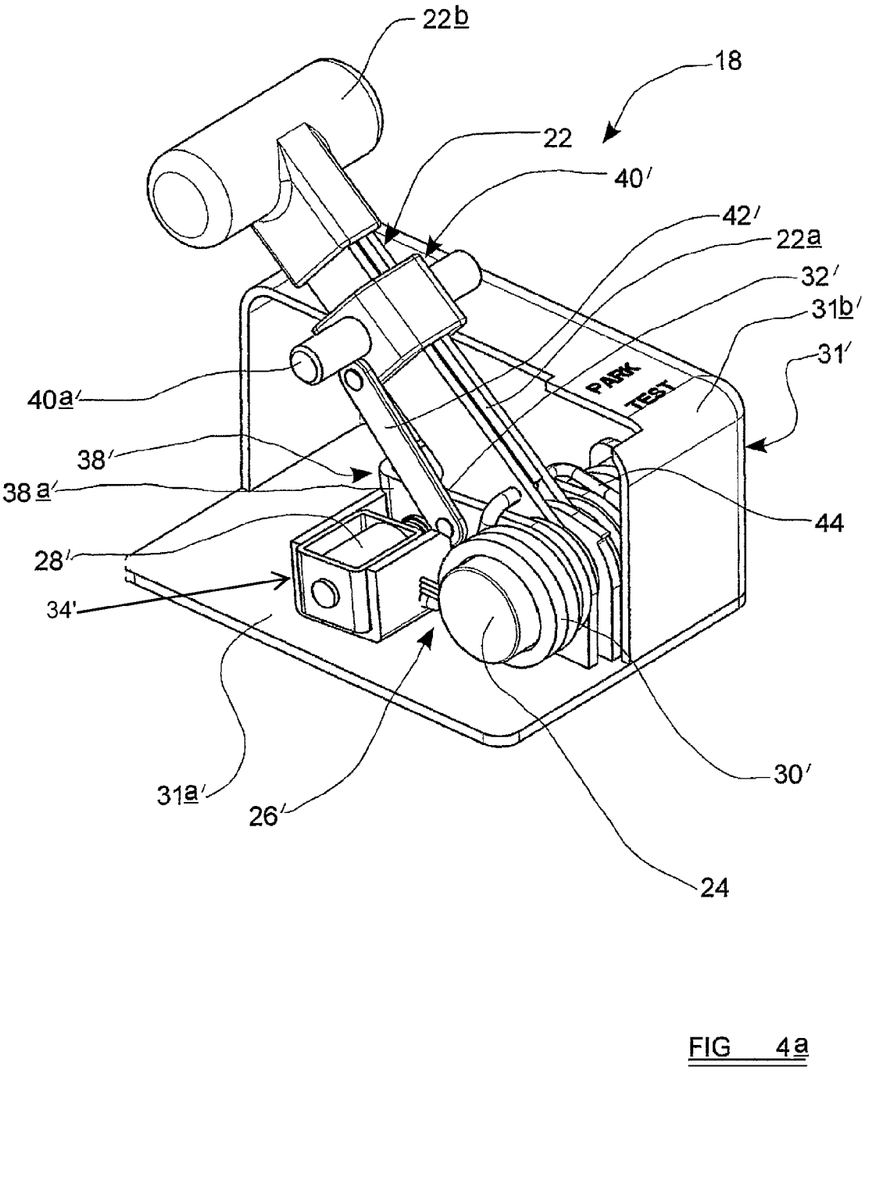
Figure 4B:
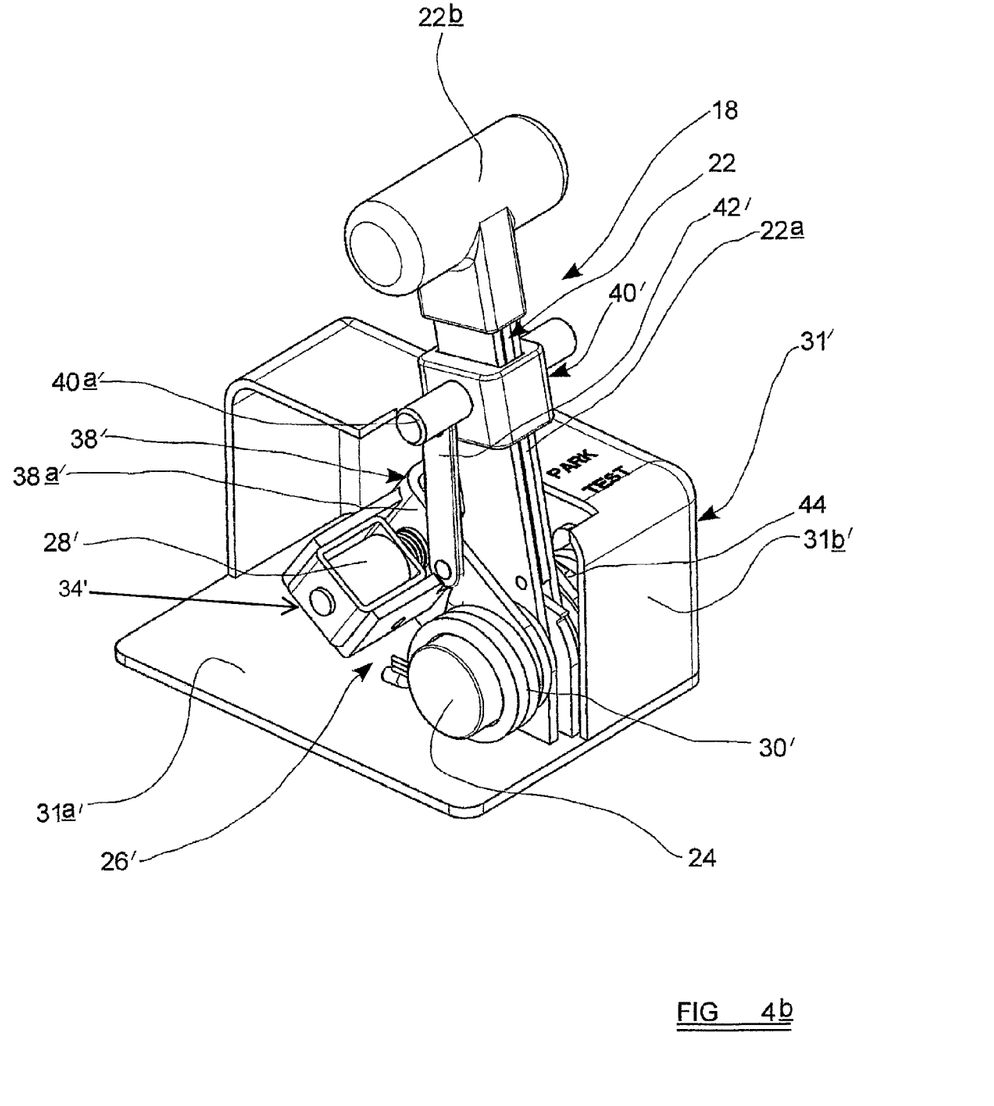
Figure 4C:
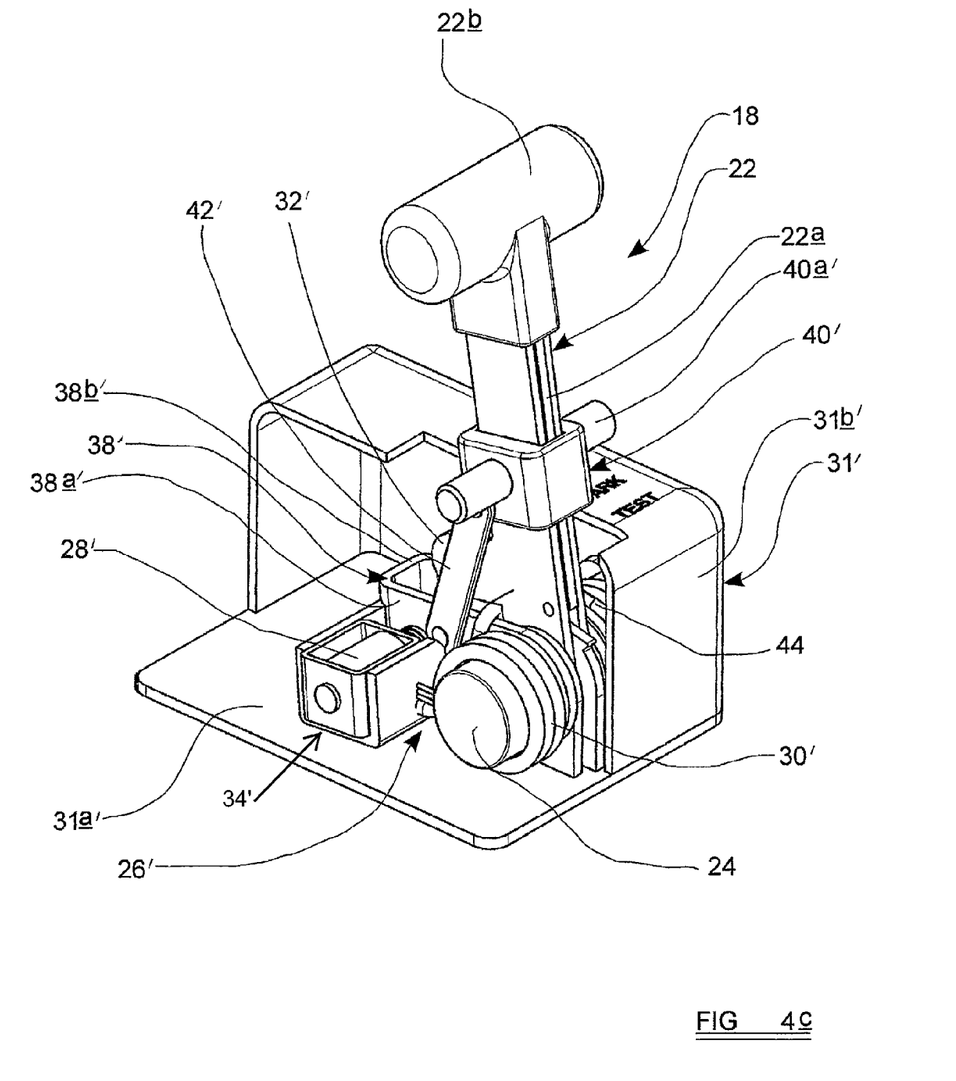
Figure 5:
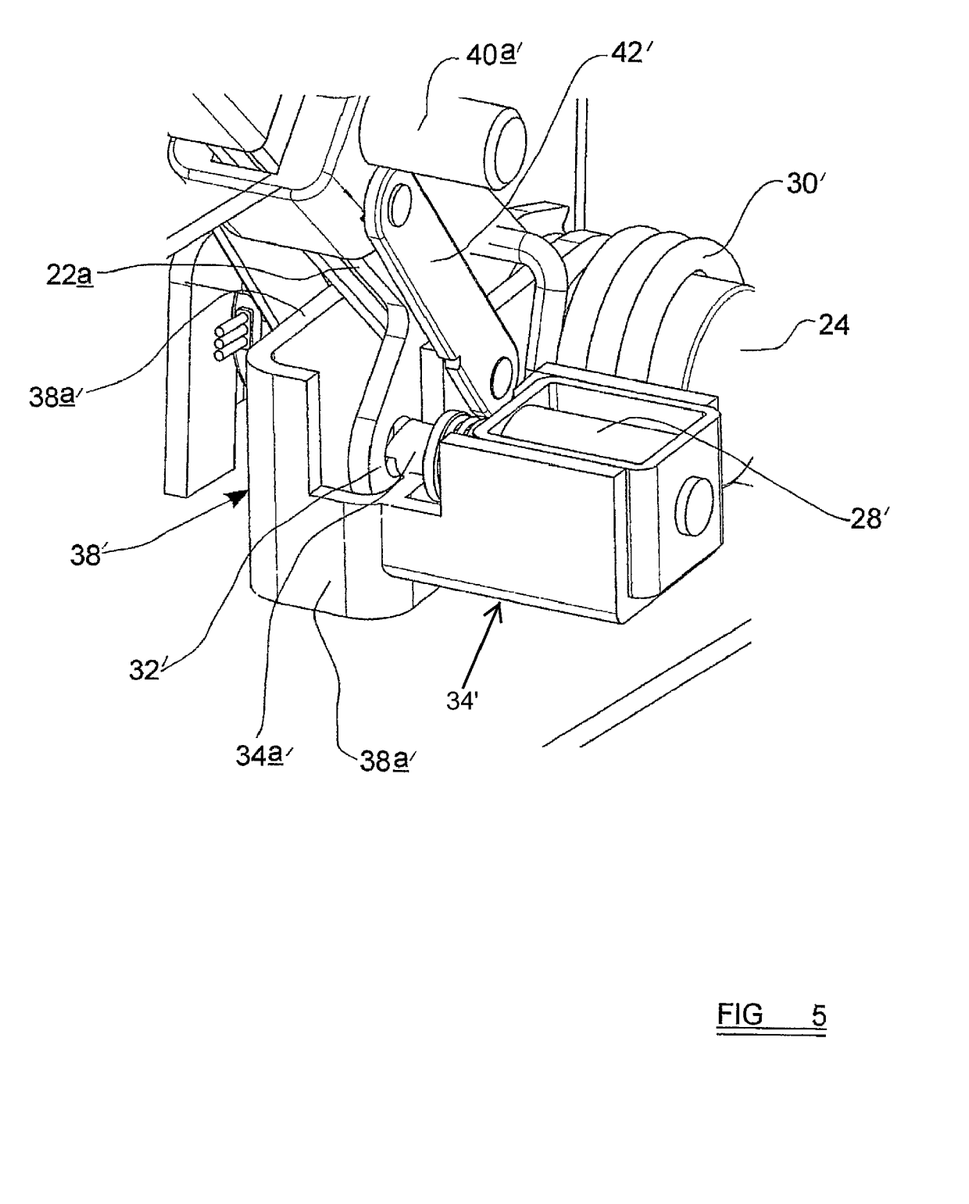
FIG. 5 is an illustration of an alternative view of a portion of the brake actuator control device shown in FIG. 4.
Figure 6A:
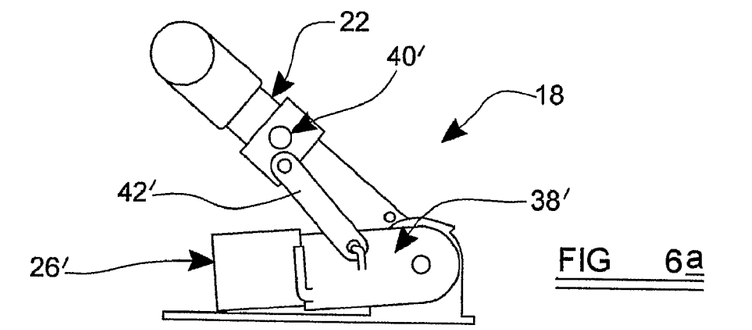
Figure 6B:
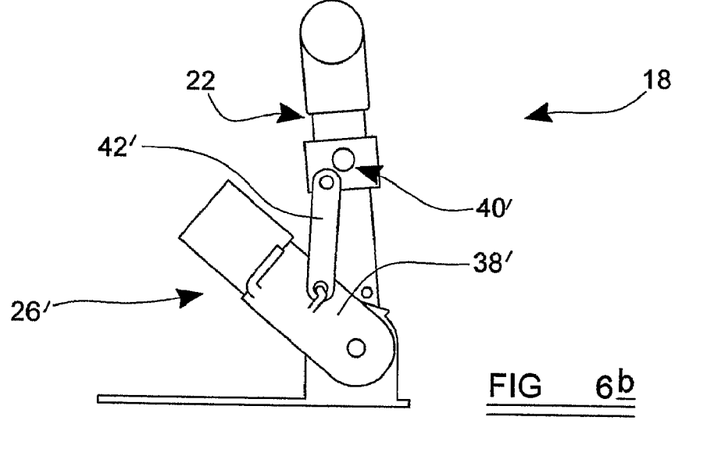
Figure 6C:
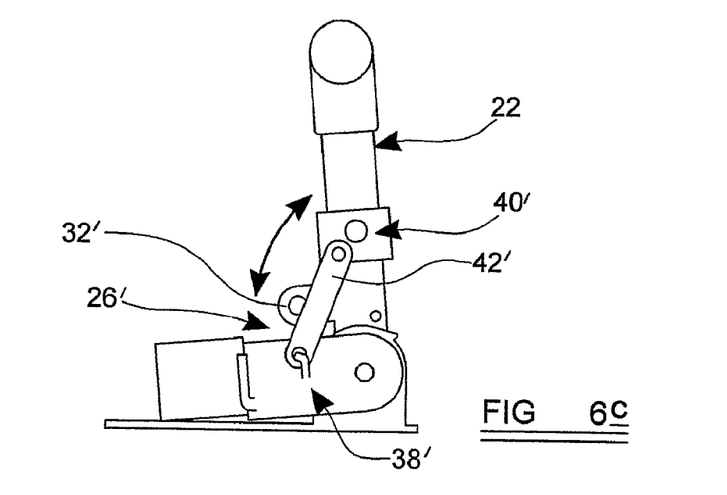

A second embodiment of control actuator 26' is illustrated in FIGS. 4 and 5. This embodiment of control actuator 26' includes a latch member 34' which engages with a keeper element 32' which is fixed on or integral with the lever 22, the latch member 34' being movable so that when the latch member 34' is engaged with the keeper element 32' and the lever 22 is moved manually by a user, the latch member 34' moves with the lever 22. The control actuator 26' also includes a resilient biasing element 30' which extends between the latch member 34' and the lever 22 so that when the latch member 34' is released from engagement with the keeper element 32', the resilient biasing element 30' exerts a force on the lever 22 and the latch member 32' to move the lever 22 to the maximum apply position.

The control actuator 26' is mounted in a housing 31' comprising a base 31a' and a top cover 31b', the top cover 31b' including a slot through which the lever 22 extends. The pivot on which the lever 22 is mounted is fixed relative to the base 31a' of the housing 31'.

The keeper element 32', which in this example is integral with the lever 22, extends from the lever 22 towards the latch member 34' and includes an aperture. The latch member 34' comprises a catch portion 34a' which is adapted to engage with the aperture provided in the keeper element 32', substantially to prevent the lever 22 from rotating relative to the latch member 34'.

The catch portion 34a' is mounted on an electrical solenoid operated actuator 28' of conventional construction, which is mounted on and fixed relative to a generally U-shaped mounting 38' with two side arms 38a' joined by a cross web 38b', the side arms 38a' being pivotally mounted on the pivot on which the lever 22 is mounted, one side arm 38a' being located on either side of the lever 22. Thus, when the catch portion 34a' is engaged with the keeper element 32', the latch member 34' pivots with the lever 22.

The solenoid operated actuator 34b' is configured such that the passage of an electric current through the solenoid causes the catch portion 34a' to retract out of engagement with the keeper element 32'.

The resilient biasing means 30' comprises a helical compression spring which extends from one side arm 32a' of the keeper element 32', around the potentiometer in a plurality of turns, and to the lever 22. The spring 30' is arranged such that, it is necessary to rotate the keeper element 32' against the biasing force of the spring, thus "charging" the spring, in order to bring the keeper element 32' into engagement with the catch portion 34a'. Thus, when the catch portion 34a' is moved by the solenoid operated actuator 28' out of engagement with the keeper element 32', the latch member 34' and lever 22 pivot away from each other under the effect of the biasing force of the spring 30' such that the latch member 34' engages with the base 31a' of the housing 31'. The biasing force provided by the spring 30' is sufficiently large that, if the lever 22 is not in the maximum apply position, the resilient biasing element 30' then pushes the lever 22 to the maximum apply position, but is not sufficient to push the lever 22 further into the test position.

Thus, if the lever 22 has been moved to the maximum apply position by the control actuator 26', the latch member 34' is engaged with the base 31a' but not with the keeper element 32', but if the lever 22 was moved manually by a user, the latch member 34' will be engaged with the keeper element 32'. Thus, a user, on returning to the vehicle and discovering the lever 22 to be in the maximum apply position, can readily establish whether the lever 22 was moved manually to the maximum apply position, or whether the lever 22 was moved to the maximum apply position by the control actuator 26', by a visual inspection to establish the position of the latch member 34'.

Once the catch portion 34a' has been moved to release the keeper element 32', and hence move the lever 22 to the maximum apply position, in order to return the lever 22 to the release position, a user must push the lever 22 against the biasing force of the spring 30' towards the latch member 34', until the catch portion 34a' engages with the keeper element 32' once more. Thus, a user, on returning to the vehicle and discovering the lever 22 to be in the maximum apply position, can also establish whether the lever 22 was moved manually to the maximum apply position, or whether the lever 22 was moved to the maximum apply position by the control actuator 26', by noting the additional force required to "charge" the spring 30' and return the lever 22 to the release position.

In order to assist in the "charging" of the spring 30', the control actuator 26' also includes a handle portion 40' which is mounted on the stem 22a of the lever 22 such that the handle portion 40' may slide along the stem 22a. The handle portion 40' includes two generally cylindrical grips 40a' which extend generally perpendicular to the stem 22a. The handle portion 40' is connected to the mounting 38' of the latch member 34' by means of an elongate connector 42'. The connector 42' is pivotally mounted on the handle portion 40' and the mounting 38' such that the lever 22 may pivot with respect to the latch member 34', such movement causing the handle portion 40' to slide along the stem 22a of the lever 22.

The handle portion 40' is adapted such that, when the latch member 34' is disengaged from the keeper element 32', a user may rest the palm of his hand on the handle 22b of the lever 22, and use his fingers to pull on the grips 40a' and slide the handle portion 40' along the stem 22a' of the lever 22 towards the handle 22b. It will be appreciated that, by virtue of the connector 42', such action causes the latch member 34' to pivot towards the lever 22 until the catch portion 34a' engages with the keeper element 32. Thus, a user may use the handle portion 40' in order to "charge" the spring 30'.

In both embodiments of the invention the control actuator 26, 26' includes an additional resilient biasing element 44, 44' which biases the lever 22 to the release position. This resilient biasing element 44, 44' is a helical spring, and extends between the housing 31, 31' and the stem 22a of the lever 22. This spring 44, 44' is stretched when the lever 22 is moved from the release position to the apply position, and therefore assists the user in returning the lever 22 to the release position, i.e. acts as a return spring. The springs 30, 30' of the control actuator 26, 26' exert a larger biasing force than the return spring 44, 44' exerts on the lever 22, however, and therefore the presence of the return spring 44, 44' does not impede effective operation of the control actuator 26, 26'.

In order to ensure that a user is not injured by movement of the lever 22 under the action of the control actuator 26, 26', damping means may be provided. Such damping means are well know, and are used, for example, in damping movement of roof grips in cars.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A braking system including a brake, a brake actuator which is operable to apply a force to the brake to effect braking, an automatic braking controller, and a brake actuator control device which is manually operable, the brake actuator control device including a control part which is manually operable, and which is movable between a release position and an apply position and which is adapted such that movement of the control part from the release position to the apply position causes the brake actuator to apply the brake and movement of the control part from the apply position to the release position causes the brake actuator to release the brake, the brake actuator control device further including a control actuator which, when in a set configuration, is adapted to engage with the control part and effect movement of the control part from the release position to the apply position on receipt of an appropriate signal from the automatic braking controller, wherein one or both of the control part and the control actuator adopts a first configuration on movement of the control part manually from the release position to the apply position, and adopts a second configuration on movement of the control part from the release position to the apply position under the action of the control actuator.

2. A braking system according to claim 1 wherein the control part includes a lever which is pivotable between the apply position and the release position.

3. A braking system according to claim 1 wherein the control actuator is configured such that, after movement of the control part to the apply position under the action of the control actuator, manual return of the control part to the release position automatically returns the control actuator to the set configuration.

4. A braking system according to claim 1 wherein manual movement of the control part between the release position and the apply position is permitted whilst the control actuator is in the set configuration.

5. A braking system according to claim 1 wherein the control actuator is electrically operated, movement of the control part from the release position to the apply position occurring on receipt of an appropriate electrical signal from the automatic braking controller.

6. A braking system according to claim 5 wherein the control actuator is operated by means of an electrical solenoid, the movement of the control actuator required to move the control part from the release position to the apply position being achieved by passing an electric current through the solenoid.

7. A braking system according to claim 1 wherein the control actuator includes a resilient biasing element which biases the control actuator into a position in which the control part is moved to the apply position.

8. A braking system according to claim 7 wherein the control actuator includes a keeper element which is biased by means of the resilient biasing element into an active position in which the keeper element bears on the control part and moves the control part to the apply position, and the control actuator further including a latch member which is capable of engagement with the keeper element to retain the keeper element in a passive position whereby the control part is permitted to move to the release position, the latch member moving on receipt of an appropriate signal from the automatic brake controller to release the keeper element so that the keeper element can move under the biasing force of the resilient biasing element to bring the control part to the apply position.

9. A braking system according to claim 7 wherein the control actuator includes a latch member which engages with a keeper element which is fixed on or integral with the control part, the latch member being movable so that when the latch member is engaged with the keeper element and the control part is moved manually by a user, the latch member moves with the control part, the control actuator further including resilient biasing element which extends between the latch member and the control part so that when the latch member is released from engagement with the keeper element, the resilient biasing element exerts a force on the control part and the latch member to move the control part to the apply position.

10. A braking system according to claim 7 wherein the brake actuator control device includes a further resilient biasing element which biases the control part to the release position.

11. A braking system according to claim 10 wherein the resilient biasing element of the control actuator exerts a larger biasing force than the further resilient biasing element exerts on the control part.

12. A braking system according to claim 1 wherein the brake actuator control device further includes a control signal generating means which generates a demand signal on movement of the control part between the release position and apply position.

13. A braking system according to claim 12 wherein the brake actuator control device is connected to the brake actuator such that the demand signal is transmitted to the brake actuator to cause the brake actuator to apply or release the brake as appropriate.

14. A braking system according to claim 12 wherein the brake actuator control device is connected to the automatic brake controller such that the demand signal is transmitted to the automatic brake controller which in turn transmits a signal to the brake actuator to cause the brake actuator to apply or release the brake as required.

15. A braking system according to claim 12 wherein the demand signal is an electrical signal.

16. A control device including a lever which is mounted on a base and movable from a first position to a second position relative to the base, and an actuator, the actuator including resilient biasing means and an electrically operable catch member which is movable from an engaged position to a release position, the actuator being adapted to permit free movement of the lever when the catch member is in the engaged position, and to act on the lever to move the lever from the first position to the second position, under a biasing force provided by the resilient biasing means.

* * * * *